Nov. 1, 1927. 1,647,320
E. G. THOMAS
INDICATING DEVICE
Filed April 14, 1923
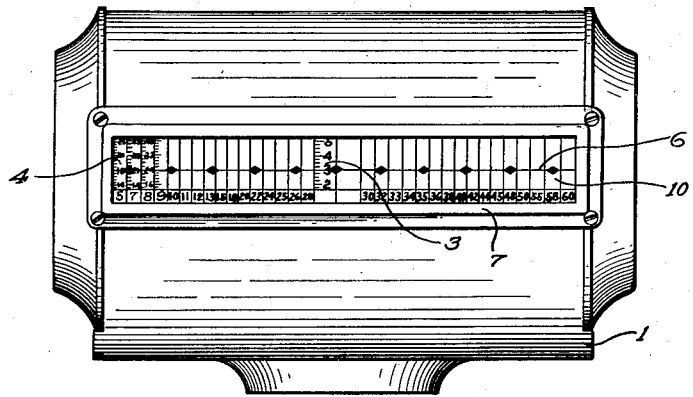
Fig. I.
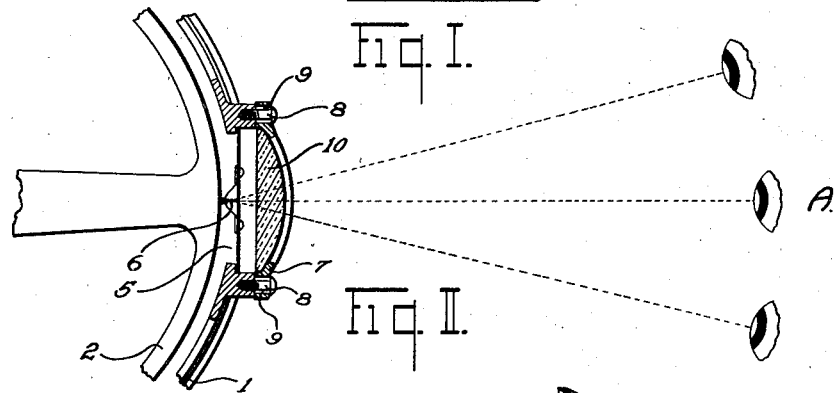
Fig. II.
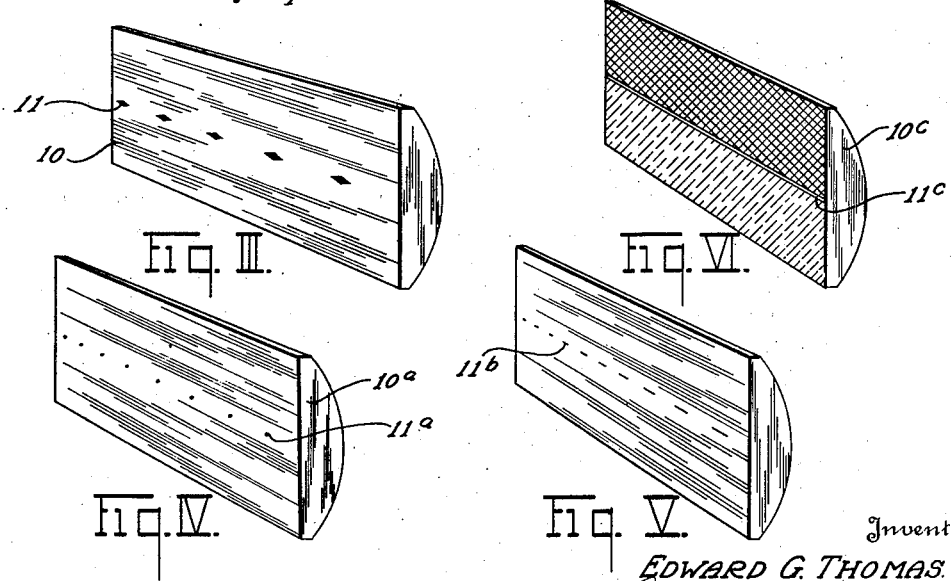
Fig. III. Fig. VI.
Fig. IV. Fig. V.
Inventor
EDWARD G. THOMAS.
By C. D. Marshall
Attorney

Patented Nov. 1, 1927.

1,647,320

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed April 14, 1923. Serial No. 632,064.

This invention relates to indicating devices, and particularly to indicators for weighing scales, and it is especially adapted for use with scales having indicators of the so-called cylinder type, although it is to be understood that its application to other types of indicators is within the purview of my invention.

Indicating devices as applied to automatic computing weighing scales usually consist of charts bearing series of computations and indexes which indicate the particular computations to be read. Since the chart and index in a device of this kind must be relatively movable and the index must at all times remain out of contact with the chart, the index and chart are usually spaced a small fraction of an inch apart and the particular figure or graduation on the chart with which the index is in apparent registration depends upon the position of the observer. My invention has for its object the provision of means to indicate to the observer whether or not he is in proper reading position and thus enable him to avoid errors due to parallax.

Parallel reading lines such as are shown and claimed in the patent to Mingle No. 1,237,365 have been employed for this purpose, but such parallel lines are objected to by the weights and measures officials of some jurisdictions on the grounds that when the eye of the observer is brought nearly but not quite into the plane passing through both lines, the two lines blend into one having an apparent width greater than the maximum width of reading line permitted by the weights and measures regulations, and that an uninformed user might attempt to read the graduations in apparent registration with the outer line, the distance of which from the chart is greater than permitted by weights and measures regulations. It is an object of my invention to provide a sighting device not open to such objections.

Another object of my invention is to provide a device which makes it possible to eliminate errors due to parallax and which makes it possible to read the scale more quickly than with a sighting device consisting merely of an additional line, and with less fatigue.

Other objects and advantages will be apparent from the following description, in which reference is had to the accompanying drawings illustrating preferred embodiments of my invention and wherein similar reference numerals designate similar parts throughout the several views.

In the drawings:—

Figure I is an elevational view of the indicator housing of a weighing scale of the cylinder type showing a preferred form of my invention;

Figure II is an enlarged detail diagrammatic sectional side elevation showing the function of the device of my invention;

Figure III is an enlarged detail perspective view of a lens provided with a preferred form of sighting device according to my invention; and Figures IV, V and VI are similar views showing modified forms thereof.

Referring to the drawings in detail, the housing 1 for the indicator mechanism may be of any preferred type. Rotatably mounted within the housing is a cylindrical chart 2 having a circumferential band or column of weight indicating figures and graduations 3 and a plurality of bands or columns of value indicating figures and graduations 4. A portion of the chart 2 is visible through an opening 5 in the front of the housing 1, and stretched from side to side of the opening 5 is a reading line consisting of a taut thread or wire 6.

A lens frame 7 is adjustably secured to the front of the housing 1 by means of screws 8 which pass through vertically elongated openings 9 in the frame. Mounted in the lens frame is a reading lens 10, the exterior surface of which is a section of a cylinder, so that the apparent height of the figures on the chart and the apparent vertical distance between the graduations are magnified when the chart is viewed through the lens.

In the form of my device shown in Figures I, II and III a series of diamond-shaped pointers 11 is marked upon the rear side of the lens 10. Since the ends of the lens frame are independently adjustable in height, the diamond-shaped pointers and the reading line may be brought into a common plane which may be horizontal or may slope upwardly or downwardly.

In reading the scale the operator moves his eye to a position in which the laterally directed pointers at the ends of the diamonds 11 are in apparent registration with the reading line, as they are shown in Figure I. This position is indicated by the letter "A" in Figure II. It will be apparent from Figures I and II that if the eye is in a position above or below proper reading position, the points of the diamonds 11 will not appear to be in registration with the reading line. The diamonds 11 thus have a function analogous to that of the rear sight of a gun, while the function of the reading wire is analogous to that of the front sight.

In Figure IV the lens 10ª is provided with a row of dots 11ª which, if it is desired that they be inconspicuous, may be mere depressions in the glass made by the point of a drill or other means.

In the form shown in Figure V the sighting indicators are in the form of short lines 11ᵇ which merge with the reading line when they are in registration. Since the sighting member is non-continuous, the reading line and the sighting indicator cannot together take on the appearance of a single line having a width greater than that of the reading line alone, nor can the sighting indicator be mistaken for the reading line.

In the form of device shown in Figure VI the upper part of the rear face of the lens 10ᶜ is provided with a transparent coat of one color, while the lower part of the rear face of the lens is provided with a transparent coat of another color, a narrow uncoated area 11ᶜ being left between the two colors. When this type of sighting indicator is used, the eye is moved to a position in which the reading line apparently lies along the center of the area 11ᶜ. While no definite mark is provided in this type of the device as a sighting indicator, the eye quite accurately locates itself so that the reading line lies centrally, just as it does in using a peep sight on a gun.

It is obvious that in none of the forms of applicant's device disclosed herein could the sighting indicator be mistaken for the reading line even by the most ignorant user and in none of them could it appear to be a part of the reading line, increasing the reading line's apparent width. The reading index and the sighting index have different forms, the reading index being linear, while the sighting index is non-linear.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a chart, a reading index, and a sighting index co-operating therewith, said sighting index being of a form having an appearance different from that of said reading index.

2. In a device of the class described, in combination, a chart, a reading index, and a sighting index co-operating therewith, one of said indices being of linear form and the other of different form.

3. In a device of the class described, in combination, a chart, a linear index, and a sighting index comprising a series of pointers co-operating therewith.

4. In a device of the class described, in combination, a chart, a linear reading index, and a sighting index co-operating therewith, said sighting index consisting of a series of diamond-shaped pointers.

5. In a device of the class described, in combination, a movable chart, a linear index extending parallel to the face of said chart, and a non-linear sighting index having a series of sighting pointers lying in a plane passing through said linear reading index.

6. In a device of the class described, in combination, a movable chart, a stationary reading index, and a stationary sighting index co-operating therewith, the apparent form of one of said indices differing from the apparent form of the other.

7. In a device of the class described, in combination, a movable chart, a linear reading index lying parallel to the face of said chart, a reading lens through which said reading index and chart are visible, and a sighting index on said lens, said sighting index being of different apparent form from said reading index.

8. In a device of the class described, in combination, a movable chart, a linear reading index lying parallel to the face of said chart, a plano-convex lens through which said reading index and said chart are visible, and a sighting index on the plane face of said lens, said sighting index being of different apparent form from said reading index.

9. In a device of the class described, in combination, a support, a cylindrical chart rotatably mounted on said support, a linear reading index mounted on said support and lying parallel to the axis of said chart and adjacent the face thereof, a reading lens through which said linear index and said chart are visible, said reading lens being adjustably mounted on said support, and a sighting index on said lens, said sighting index being of different apparent form from said reading index.

10. In a device of the class described, in combination, a support, a cylindrical chart rotatably mounted on said support, a linear reading index mounted on said support and lying parallel to the axis of said chart and adjacent the face thereof, a reading lens through which said linear index and said chart are visible, said reading lens being adjustably mounted on said support, and a sighting index on said lens, said sighting index consisting of a series of pointers.

11. In a device of the class described, in combination, a support, a cylindrical chart rotatably mounted on said support, a linear reading index mounted on said support and lying parallel to the axis of said chart and adjacent the face thereof, a reading lens through which said linear index and said chart are visible, said reading lens being adjustably mounted on said support, and a sighting index on said lens, said sighting index consisting of a series of diamond-shaped pointers.

EDWARD G. THOMAS.